United States Patent [19]
Levy

[11] Patent Number: 4,779,348
[45] Date of Patent: Oct. 25, 1988

[54] DATA PLOTTER

[76] Inventor: Nessim I. Levy, 13 Habrosh Street, Savyon, Israel

[21] Appl. No.: 906,955

[22] Filed: Sep. 15, 1986

[30] Foreign Application Priority Data

Sep. 27, 1985 [IL] Israel ..................................... 76516

[51] Int. Cl.⁴ .......................... G01D 9/40; B43L 13/10
[52] U.S. Cl. ..................... 33/23.03; 33/1 M; 346/29; 346/139 R
[58] Field of Search ............... 33/23.03, 23.02, 1 M, 33/503, 32.03, 32.05; 346/29, 139 R

[56] References Cited

U.S. PATENT DOCUMENTS

| | | | |
|---|---|---|---|
| 2,584,267 | 2/1952 | Hayek | 346/29 |
| 3,293,651 | 12/1966 | Gerber et al. | 346/29 |
| 3,550,276 | 12/1970 | Kramer et al. | 33/23.03 |
| 3,844,461 | 10/1974 | Robison et al. | 33/1 M |
| 4,524,520 | 6/1985 | Levy | 33/1 M |
| 4,540,994 | 9/1985 | Lawrence | 346/139 R |
| 4,597,182 | 7/1986 | Rinn | 33/1 M |

FOREIGN PATENT DOCUMENTS 1538660  1/1971  Fed. Rep. of Germany ....... 33/1 M

*Primary Examiner*—William A. Cuchlinski, Jr.
*Assistant Examiner*—Patrick R. Scanlon
*Attorney, Agent, or Firm*—Benjamin J. Barish

[57] ABSTRACT

A data plotter includes a table for supporting a record sheet, a carriage movable thereon along one orthogonal axis, and a recording device carried by the carriage and movable with respect thereto along the other orthogonal axis. Relative movement is effected between the carriage and table by means of a drive including a pair of spaced racks mounted on one, each meshing with a motor-driven pinion mounted on the other. The data plotter further includes an electronic synchronizing system for synchronizing the operation of the two motors driving the two pinions along the two racks.

12 Claims, 5 Drawing Sheets

DATA PLOTTER

BACKGROUND OF INVENTION

The present invention relates to data plotters, namely to instruments which receive and record data on record sheets, e.g. for plotting curves, preparing drawings, and the like.

A number of different types of data plotters are known. Generally speaking, the known data plotters are of heavy construction to provide high rigidity in order to permit high accerleration and velocity while maintaining high precision. Such heavy constructions also require a relatively large drive. For these reasons, the known data plotters are usually large, heavy and expensive.

An object of the present invention is to provide a data plotter of improved construction in the above respects.

SUMMARY OF THE INVENTION

According to a broad aspect of the present invention, there is provided a data plotter including a table for supporting a record sheet, a carriage movable thereon along one orthogonal axis, and a recording device carried by the carriage and movable with respect there to along the other orthogonal axis; characterized in that relative movement is effected between the carriage and table by means of a drive including a pair of spaced racks mounted on one, each meshing with a motor-driven pinion mounted on the other; the data plotter further including an electronic synchronizing system for synchronizing the operation of the two motors driving the two pinions along the two racks. Each of the two racks is yieldingly mounted and includes spring means for self-centering the respective rack with respect to its pinion in the direction transversely of the length of the rack.

More particularly, the electronic synchronizing system includes, for each of the motors, an encoder outputting electrical signals corresponding to the operation of its respective motor, and a synchronizing circuit comparing the electrical signals from each of the encoders for synchronizing the operation of the two motors.

The invention is particularly useful in constructions wherein the table is a fixed, flat table on which said pair of spaced racks are mounted, and wherein the carriage overlies the table and carries the motor-driven pinions.

According to further features of the invention, the above two racks are yieldingly mounted and are spring-urged into engagement with their respective pinions; also the recording device is mounted on a further carriage including a further motor-driven pinion meshing with a further rack mounted on the first-mentioned carriage also in a yielding manner and spring-urged against its respective pinion.

It has been found that data plotters can be built in accordance with the foregoing features to provide relatively small, compact and light constructions with high acceleration and velocity while still maintaining high precision and quality in the drawn lines.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
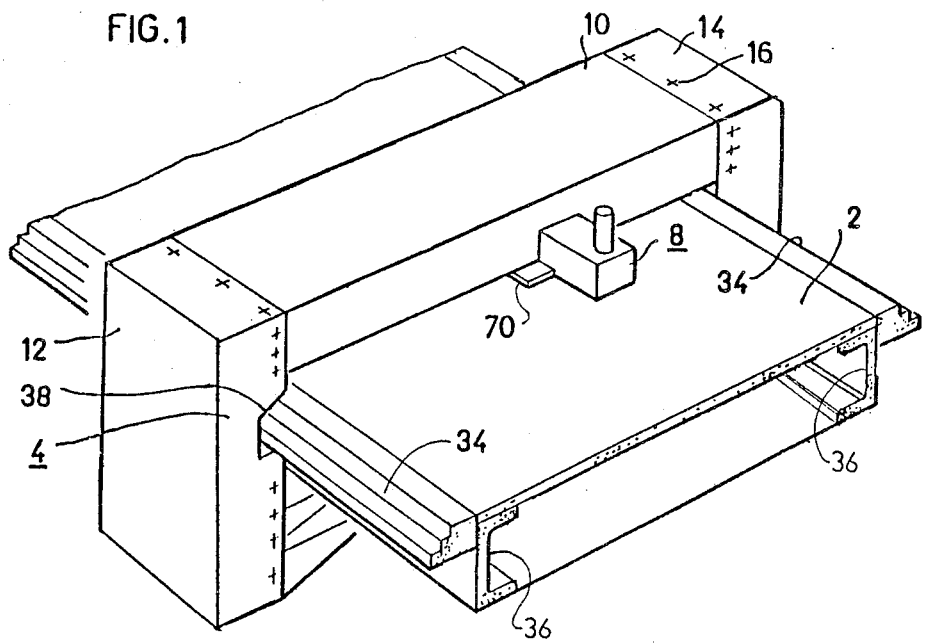
FIG. 1 is a three-dimensional view illustrating a data plotter constructed in accordance with the invention.

The data plotter illustrated in the drawings is of the flat-table type, namely one including a flat fixed table, generally designated 2, for supporting a record sheet; an X-carriage, generally designated 4, movable over the table along the X-axis of the table; and a Y-carriage, generally designated 6 (FIG. 2), carrying the recording device 8 and movable on the X-carriage along the Y-axis. Thus, the recording device 8 may be moved to any particular point on table 2, defined by X,Y coordinates, by moving the X-carriage 4 along table 2 to the X-coordinate, and moving the Y-carriage 6 carrying the recording device along the X-carriage to the Y-coordinate.

The X-carriage 4 is constituted of a main section 10 and a pair of end sections 12, 14, all secured together, as by fasteners 16, so as to move as a unit along the X-axis of the table 2. For this purpose, the table supports a pair of X-racks 18, 20 (see FIG. 2), and the two end sections 12, 14 of the carriage 4 support a pair of X-motors 22, 24 each driving a pinion, e.g. pinion 26 for X-motor 24 illustrated in FIG. 8, underlying and meshing with the respective rack, this being rack 20 in FIG. 8. For synchronizing the operation of the two X-motors 22, 24, each drives an encoder 22', 24' (FIGS. 2 and 9) which output electrical signals corresponding to the operation of their respective motors to control them in a closed-loop system schematically illustrated in FIG. 9 and as will be described more particularly below.

Figure 2:
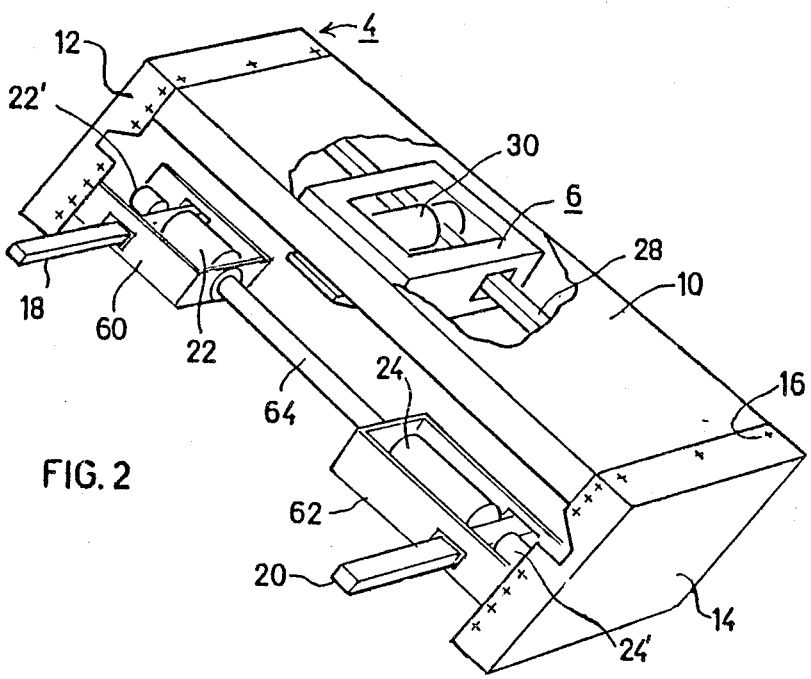
FIG. 2 is a three-dimensional view illustrating the data plotter of FIG. 1 with a portion of both the X-carriage and Y-carriage removed to show internal structure.
Figure 3:
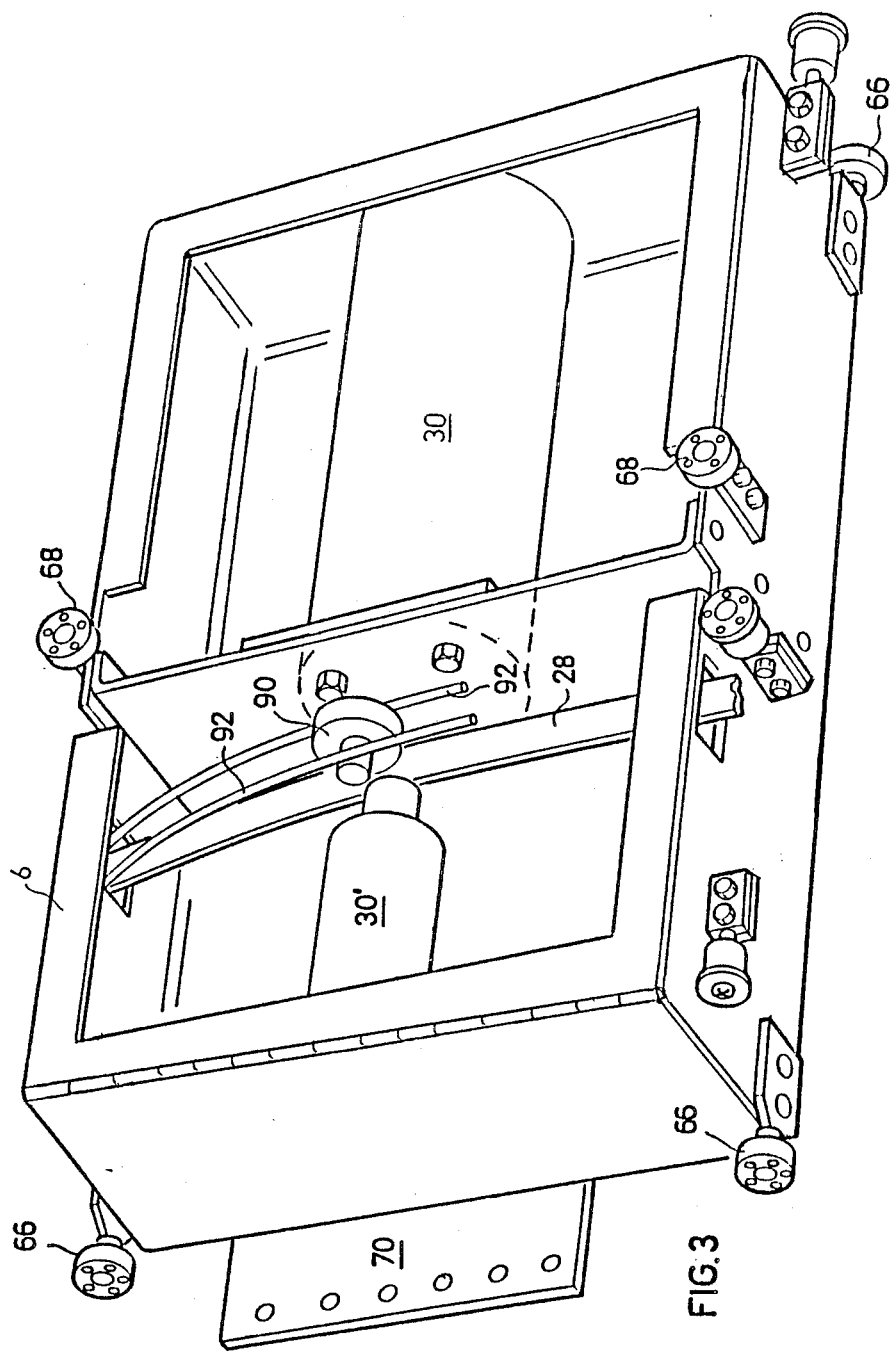
FIG. 3 is a three-dimensional view illustrating only a portion of the Y-carriage of FIGS. 1 and 2.

The drive along the Y-coordinate includes a Y-rack 28 carried by the X-carriage 4 and extending longitudinally thereof (FIG. 2), and a Y-motor 30 having a pinion meshing therewith and mounted to Y-carriage 6 (FIGS. 2, 3). The Y-motor 30, carrying the recording device 8, also drives an encoder 30' (FIGS. 3 and 9) outputting electrical signals used to control its drive as also described below.

More particularly, the flat table 2 is provided with steps or rails 34 at its opposite longitudinal sides, as shown in FIG. 1. Each of these rails 34 is secured to frame members 36 of the flat table 2 (FIG. 6). The end sections 12, 14 of the X-carriage 4 are provided with slots 38 (FIGS. 1, 5) receiving the rails of the table.

Figure 4:
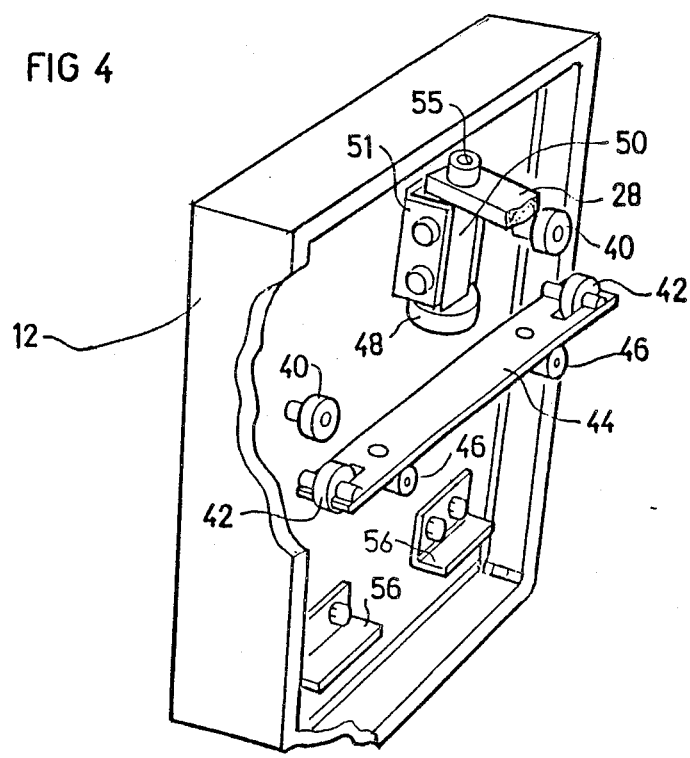
FIGS. 4 and 5 are three-dimensional views illustrating the internal structure at the two ends of the X-carriage of FIGS. 1 and 2.

Each carriage end section 12, 14 further includes a set of rollers engageable with the table rails to permit the X-carriage 4 to move along them, i.e. along the X-coordinate. The set of rollers carried by the left end section 12 is shown in FIG. 4, and that carried by the right end section 14 is shown in FIG. 5.

Thus, as shown in carriage end section 12 (FIG. 4), the roller set includes a pair of vertical rollers 40 engageable with the upper horizontal faces of the rails 34., and a further pair of rollers 42 carried at the opposite free ends of a leaf spring 44 secured by a pair of studs 46, which latter rollers are engageable with the underface of the rails. The carriage end section 12 further includes a horizontal roller 48 supported on a vertical arm 50 such that the roller 48 engages the flat vertical face of the respective rail 34.

Figure 5:
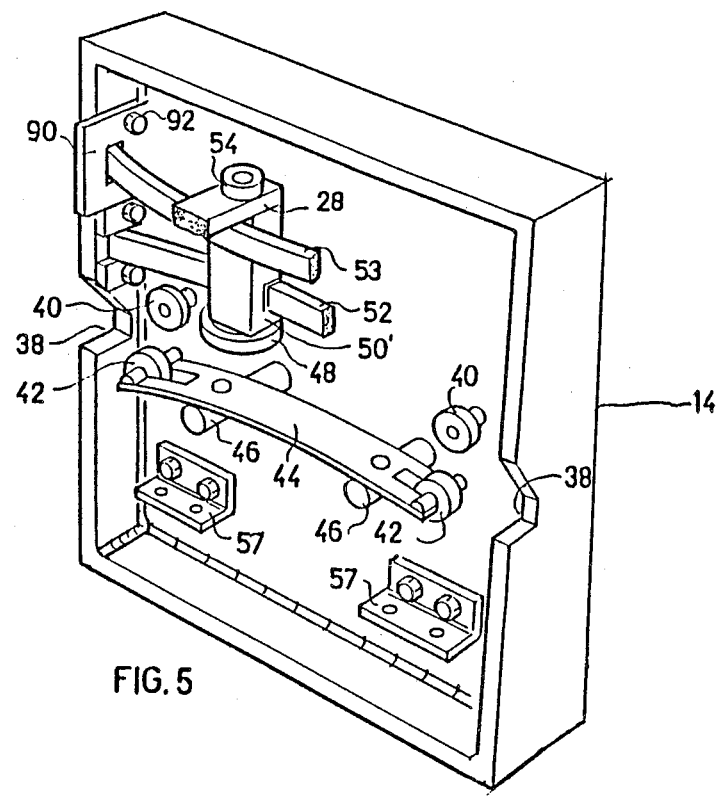
Figure 6:
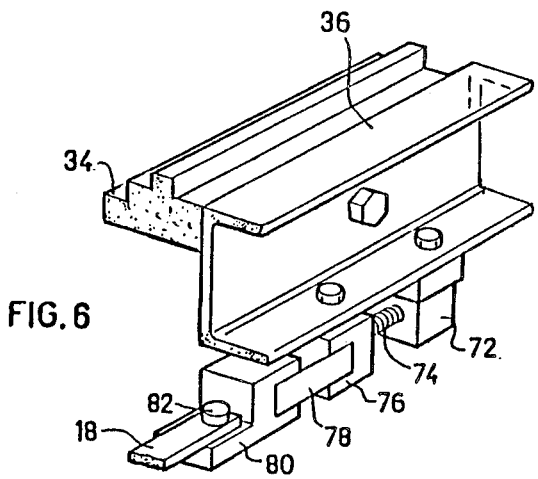
FIG. 6 is a fragmentary view illustrating the mounting of the X-racks in the data plotter of FIGS. 1 and 2.

As shown in FIG. 5, the right end section 14 of the X-carriage 6 includes a similar set of rollers 40, 42, 48, engageable with the rail 34 at the right side of the table 2. Whereas the vertical arm 50 carrying the horizontal roller 48 in the left end section 12 is fixed to the carriage end section by a mounting bracket 51, the corresponding arm 50' in the right end section 14 illustrated in FIG. 5 is floatingly mounted between a pair of spring members 52, 53. Spring member 52 engages the lower end of the outer face of mounting arm 50' to urge the horizontal roller 48 inwardly, i.e. firmly against the vertical face of its respective rail 34, whereas spring member 53 engages the upper end of the inner face of the mounting arm 50', urging its upper end outwardly.

One end of the Y-rack 28 is secured, e.g. by fastener 54, to the upper end of the floating mounting arm 50' in the right end section 14 of the X-carriage as shown in FIG. 5. The opposite end of the Y-rack 28, as shown in FIG. 4, is secured by a fastener 55 to the upper end of the fixed mounting arm 50 in the left end section 12 of the Y-carriage. Thus, spring 53, urging the outer end of the floating mounting arm 50' outwardly, is effective to tension the Y-rack 28 between the latter arm 50' and the fixed mounting arm 50 in the left end section 12 of the X-carriage.

Figure 7:
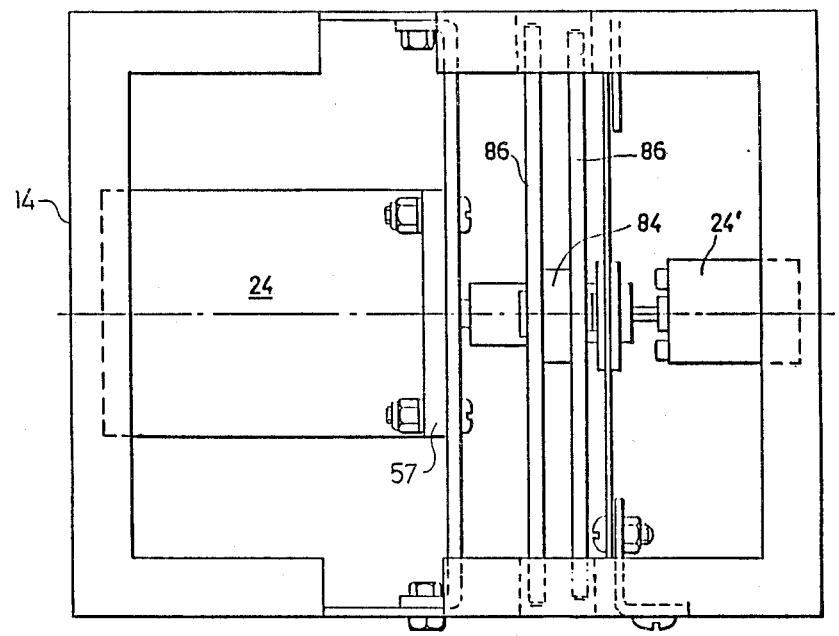
FIGS. 7 and 8 are top and end elevational views respectively, illustrating the drive cooperable with one of the X-racks.

Each of the two carriage end sections 12, 14 further includes a pair of mounting brackets 56, 57 for mounting the respective X-motor 22, 24. As shown particularly in FIG. 2, each X-motor 22, 24 is carried by a mounting yoke 60, 62 fixed to the respective brackets 56, 57 (FIG. 7), the two yokes being connected together by a connecting rod 64 extending transversely across the X-carriage 4.

The Y-carriage 6, carrying the Y-motor 30 and its pinion meshable with the Y-rack 28, is provided with a plurality of rollers 66 (FIG. 3) movable along longitudinal rails defined by in-turned flanges (not shown) extending along the length of the main X-carriage section 10. The Y-carriage 32 further includes horizontal rollers 68 engageable with the inner faces of the main X-carriage section 10, and also a mounting plate 70 receiving the recording device 8.

Figure 8:
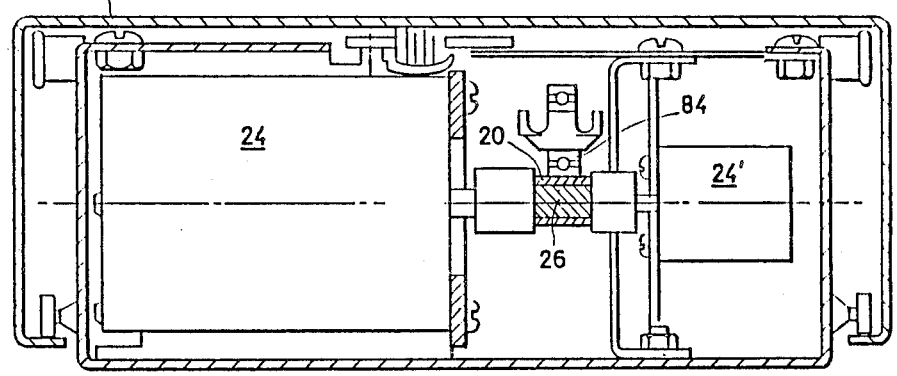

The two X-racks 18, 20 are yieldingly mounted to the table 2 at its opposite longitudinal sides for meshing with the X-motor pinions, e.g. 26, in FIG. 8. Thus, as best shown in FIG. 6 illustrating the mounting of one end of one rack (18), the table frame member 36, to which the rails 34 are secured, also supports a mounting bracket 72 at each end. Each bracket 72 threadedly receives a pin 74 whose opposite end carries another bracket 76. The latter bracket is secured by a pair of leaf springs 78 to a floating member 80 to which the respective end of the X-rack 18 is secured by fastener 82.

Although FIG. 6 illustrates only one leaf spring 78 connecting one face of the two members 76 and 80, it will be appreciated that there is a second corresponding leaf spring, parallel to leaf spring 78, connecting the opposite face of these two members. These leaf springs 78 thus mount the two X-racks 18 in a manner permitting them to yield in the direction at right angles to the planes of the two leaf springs 78, i.e. parallel to the rotary axis of the pinion on their respective X-motor 22, 24. Thus, the two racks may self-center themselves with respect to their drive pinions.

The two X-racks 18, 20 overlie their respective motor-driven pinions and are spring-urged into engagement with them. Thus, as shown particularly in FIGS. 7 and 8, a roller bearing 84 is floating mounted by a pair of spring members 86 and is urged by these members into meshing engagement with the respective X-rack (20) so as to press it against its motor-driven pinion (26).

The Y-rack 28, yieldingly mounted in the X-carriage 4 and tensioned in its longitudinal direction between the mounting arms 50 and 50' as described above, is also spring-urged into engagement with the pinion of the Y-motor 30. This is best illustrated in FIG. 3, wherein it will be seen that a roller bearing 90 overlying the Y-rack 28 is urged against that rack by a pair of springs 92 extending transversely across the Y-carriage 6. Springs 92 thereby urge the Y-rack 28 into meshing engagement with the underlying pinion driven by the Y-motor 30.

Figure 9:
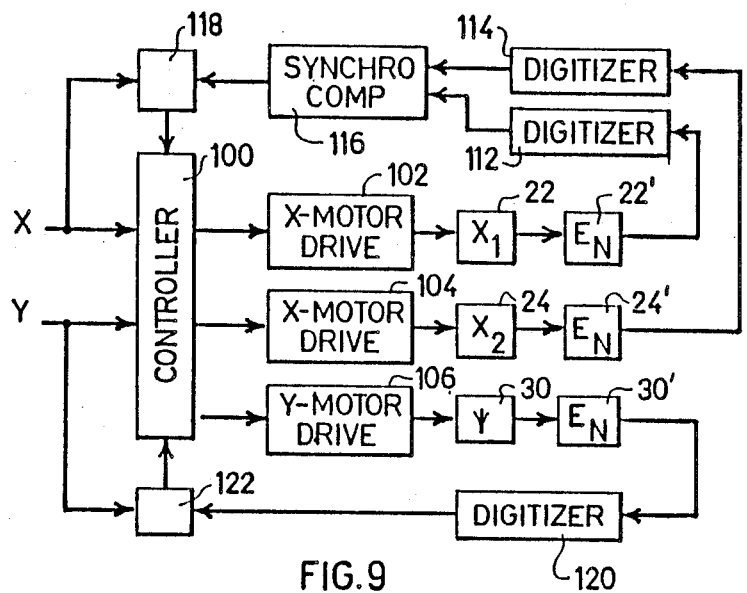
FIG. 9 is a block diagram schematically illustrating the electrical system in the data plotter of FIGS. 1 and 2.

The operation of the illustrated data plotter will be apparent from FIG. 9. Thus, the input commands defining the X, Y-coordinates of the points to be plotted are inputted into a controller 100 which outputs the appropriate command signals to a drive unit 102 for the first X-motor 22, a drive 104 for the second X-motor 24, and a drive unit 106 for the Y-motor 30. The two X-motors 22, 24 are driven according to the command so that the X-carriage 4 is moved to the commanded X-coordinate by the rotation of the X-motor pinions 26 with respect to the X-racks 18, 20 mounted on the fixed table 2. The Y-carriage 32 is driven to the commanded Y-coordinate along the X-carriage 4 by the rotation of the pinion of the Y-motor 30 with respect to the Y-rack 28.

The operation of the two X-motors 22,24 is synchronized by their respective encoders 22', 24' which output electrical signals corresponding to the amount of rotation of their respective motors. The outputs of the encoders 22', 24' are digitized in digitizers 112, 114, and are then fed to a synchonous comparison circuit 116 which, in turn, outputs an electrical signal to an X-coordinate comparison circuit 118. The latter circuit compares the actual operation of the X-motors 22, 24 with the commanded operation and provides a feed-back error signal to the controller 100, to correct the error, whenever there is an error, whether absolute or differential, between the commanded operation and the actual operation of either or both of the x-motor. During, each starting operation, the x-carriage is returned to a zero starging point to avoid initial errors.

The actual operation of the Y-motor 30 is also compared with the input Y-coordinate command to provide a feed-back control signal to the controller 100. The actual operation of the Y-motor is sensed by its encoder 30' whose output is digitized in digitizer 120 and is fed to a comparison circuit 122. The latter circuit also receives the Y-coordinate command signal and produces an error signal which is fed back to the controller to correct any error between the commanded and actual operations of the Y-motor.

It has been found that the illustrated construction, particularly the provision of the two synchronized X-motor drives for the X-carriage and the yielding mountings for the X-racks and Y-racks, permits data plotters to be constructed having a capability of high acceleration, high velocity, and high precision, with relatively light-weight parts and low-power drives.

While the invention has been described with respect to one preferred embodiment, it will be appreciated that many variations, modifications and other applications of the invention may be made. For example, the invention could be used in engraving, cutting, scanning and other devices involving orthogonal movements, by merely incorporating the appropriate working head.

What is claimed is:

1. A data plotter including table means for supporting a record sheet, carriage means movable thereon along one orthogonal axis, and a recording device carried by said carriage means and movable with respect thereto along an other orthogonal axis; characterized in that relative movement is effected between said carriage means and table means by a drive including two spaced racks mounted on one of said means, meshing with two pinions driven by two motors mounted on the other of said means; each of said racks including spring means for self-centering the respective rack with respect to its pinion in the direction transversely of the length of the rack; the data plotter further including an electronic synchronizing system for synchronizing the operation of the two motors driving the two pinions along the two racks.

2. A data plotter according to claim 1, wherein said electronic synchronizing system includes, for each of said motors, an encoder outputting electrical signals corresponding to the operation of its respective motor, and a synchronizing circuit comparing the electrical signals from each of said encoders for synchronizing the operation of the two motors.

3. A data plotter according to claim 2, wherein said table means include a fixed, flat table on which said two spaced racks are mounted, said carriage means overlying said table and carrying said motors and pinions.

4. A data plotter according to claim 3, wherein the opposite sides of said flat table support rails extending parallel to said two spaced racks, each rail having a horizontal face and a vertical face, said carriage means including first rollers at each of its opposite sides engageable with the horizontal faces of said rails, and further rollers at each of its opposite sides engageable with the vertical faces of said rails.

5. A data plotter according to claim 1, wherein said recording device is movable along said other orthogonal axis by a further drive including a further motor-driven pinion meshing with a further rack mounted on said carriage means; said further rack also including spring means for tensioning the rack along its length.

6. A data plotter including table means for supporting a record sheet, carriage means movable thereon along one orthogonal axis, and a recording device carried by said carriage means and movable with respect thereto along an other orthogonal axis; relative movement being effected between said carriage means and table means by a drive including a pair of spaced racks mounted on one of said means meshing with two pinions driven by two motor mounted on the other of said means; each of said racks being yieldingly mounted by spring means self-centering the respective rack with respect to its pinion in the direction transversely of its length; the data plotter further including an electronic synchronizing system for synchronizing the operation of the two motors driving the two pinions along the two racks.

7. A data plotter according to claim 6, wherein said electronic synchronizing system includes, for each of said motors, an encoder outputting electrical signals corresponding to the operation of its respective motor, and synchronizing circuit comparing the electrical signals from each of said encoders for synchronizing the operation of the two motors.

8. A data plotter according to claim 7, wherein said table means includes a horizontal table on which said pair of spaced racks are mounted, said carriage means overlying said table and carrying said motors and pinions.

9. A data plotter according to claim 8, wherein the opposite sides of said table support rails extending parallel to said pair of spaced racks, each rail having a horizontal face and a vertical face, said carriage means including first rollers at each of its opposite sides engageable with the horizontal faces of said rails, and further rollers at each of its opposite sides engageable with the vertical faces of said rails.

10. A data plotter according to claim 9, wherein at least one of said further rollers at each side of the carriage means is yieldingly mounted in a direction perpendicular to said vertical face of its respective rail and includes a spring urging it in said direction against the vertical face of its respective rail.

11. A data plotter including a table for supporting a record sheet, a carriage movable thereon along one orthogonal axis, and a recording device carried by said carriage and movable with respect thereto along another orthogonal axis; relative movement being effected between said carriage and table by means of a drive including two spaced racks mounted on said table meshing with two pinions driven by two motors mounted on said carriage; each of said racks including spring means for self-centering the rack with respect to its pinion in the direction transversely of the length of the rack; the data plotter further including an electronic synchronizing system for synchronizing the operation of the two motors driving the two pinions along the two racks; said recording device being mounted on further carriage including a further motor-driven pinion meshing with a further rack mounted on said first mentioned carriage; said further rack including spring means for tensioning the further rack along its length.

12. A data plotter according to claim 11, wherein said electronic synchronizing system includes, for each of said motors, an encoder outputting electrical signals corresponding to the operation of its respective motor, and a synchronizing circuit comparing the electrical signals from each of said encoders for synchronizing the operation of the two motors.

* * * * *